3,547,981
PROCESS FOR PREPARING ALKYL
MUCONATES AND MALEATES
Gian Paolo Chiusoli, Novara, Carlo Venturello, Turin,
Mario Ferraris, Novara, and Sergio Merzoni, Milan,
Italy, assignors to Montecatini Edison S.p.A., Milan,
Italy, a corporation of Italy
No Drawing. Filed July 24, 1967, Ser. No. 655,327
Claims priority, application Italy, July 27, 1966,
17,384/66; Apr. 18, 1967, 15,061A/67
Int. Cl. C07c 69/52, 69/60
U.S. Cl. 260—485    5 Claims

ABSTRACT OF THE DISCLOSURE

Described is a process for preparing alkyl muconates and maleates from acetylene, carbon monoxide and methanol or ethanol. The process is characterized in that the reaction is carried out in alcoholic solution of thiourea and of a palladium halide, selected from $PdCl_2$, $PdBr_2$, $PdI_2$, at temperatures from 0° to 30° C. and under atmospheric pressure.

---

The present invention relates to a process for preparing methyl, or ethyl, muconate and methyl, or ethyl, maleate from acetylene, carbon monoxide and methanol.

$CH_3OOC-CH=CH-CH=CH-COOCH_3$ dimethyl muconate dimethyl 2,4-hexadiendioate

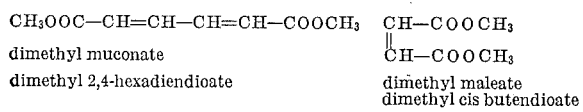

dimethyl maleate
dimethyl cis butendioate

According to the known art, it is possible to obtain the above-mentioned unsaturated esters from acetylene, carbon monoxide and methanol using:

(1) nickel carbonyl and hydrochloric acid, with contemporaneous formation of acrylates and propionates (British Pat. 943,721);

(2) Palladium and its salts in the presence of iodine at 60–150° C., which yield maleates, furmarates and succinates (German Pat. 1,138,760);

(3) Palladium chloride, complexed with benzonitrile, in benzene, under pressure of 100 atm., and successive alcoholysis of the chlorides of acids thus obtained (J. Tsuji, J. Am. Chem. Soc., 86 (1964), 2095).

We have surprisingly found that it is possible to react palladium chloride in methanol solution, under atmospheric pressure and at room temperature, by addition of thiourea. The thiourea increases the formation of unsaturated esters, which occurs only in reduced amounts when palladium chloride alone is used, and minimized the precipitation of metal palladium thus making the reaction catalytic on the palladium chloride.

The catalytic process may be expressed by the following equations:

(1) $CH\equiv CH+2CO+2CH_3OH \rightarrow$
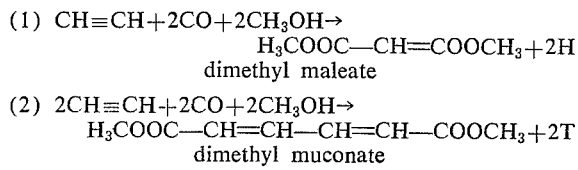
dimethyl maleate (2) $2CH\equiv CH+2CO+2CH_3OH \rightarrow$
$H_3COOC-CH=CH-CH=CH-COOCH_3+2T$
dimethyl muconate The hydrogen is not released as such, but it hydrogenates the acetylene and other substances which are present. Thus, one of the products which may be formed is β-hydromuconate. The thiourea secures the survival of the catalytic intermediate thus avoiding the separation of metal palladium. The thiourea, however, must be introduced in small amounts as otherwise the reaction slackens rapidly and stops.

Furthermore, it has been surprisingly found that by the use of small percentages of oxygen in the gases, it is possible to avoid the separation of palladium and increase remarkably the catalytic activity of the thiourea introduced. Furthermore, the hydrogenation by-products are minimized. The oxygen may be added to the gases as such or as air.

It is advisable to introduce slowly into the reaction mixture a very fine suspension of palladium chloride or an alcoholic solution containing palladium chloride and thiourea, which is used in order to keep the catalytic intermediate alive.

The total amount of thiourea to be used, at the start of the reaction, corresponds to the minimum amount necessary to avoid the separation of metal palladium. This minimum amount depends on the presence of oxygen in the gases. The presence of small amounts of water, which tend to cause the reduction of the palladium salt, also influences the minimum amount of thiourea to be used.

The catalyst may be further improved by using palladium bromide and palladium iodide instead of palladium chloride. Palladium iodide more easily gives sediments of metal Pd and must be used together with an amount of thiourea higher than that necessary when chloride and bromide are used.

The preferred molar ratios for the reactants vary from 3 to 0.3 (preferably about 1) for the ratio $C_2H_2/CO$; from 2 to 10 for the ratio thiourea/$PdX_2$, and higher than 0.5 for the ratio $O_2/PdX_2$. The concentration of the oxygen in the gases has to be obviously kept at low values for safety reasons. It is preferred to maintain said concentrations at less than 1% by volume. The gases may be recycled.

The reaction is carried out at temperatures between 0° and 30° C. under atmospheric pressure. It is necessary to carefully control the temperature to avoid unexpected heatings which cause the Pd to precipitate and the reaction to cease.

The reaction products are prevailingly muconate and maleate. At the end of the treatments generally used for the separation of the products, the maleate is present primarily as the trans, trans isomer. A small amount of furmarate is also present. The products heavier than the muconate are generally present in amounts not higher than 30% by weight on the total product. The β-hydromuconate is generally contained in the product mixture in very small amounts provided that the reaction is carried out in the presence of a sufficient amount of oxygen. The hydrogenation of the acetylene to ethylene is also minimized, when operating in the presence of oxygen. The ratio between muconate and maleate varies within wide ranges depending on the concentration of the palladium halide and on the ratio between acetylene and carbon monoxide. The increase of these factors gives an increase of the ratio between muconate and maleate.

The separation of the products is performed according to the generally used modalities. The alcohol in excess is distilled off, the residue is extracted with ether, washed, dried and the ether extract is distilled. The components of the residue are then separated by chromatography. The mixture containing palladium halide and thiourea and which remains as the residue after the ether extraction, may be recycled after purification.

The products are useful intermediates for resins. The muconate may also be hydrogenated to adipate, an intermediate for the preparation of nylon.

The following examples illustrate the present invention without limiting it.

EXAMPLE 1

Into a 250 cc. flask, equipped with mechanical agitator, dropping funnel, inlet and outlet gas tubes, 0.25 g. of thiourea dissolved in 60 cc. of distilled methanol were introduced. A gaseous mixture of CO and $C_2H_2$ in the volume ratio 1:1 was passed through the flask, at about 20° C. Contemporaneously through the funnel, a suspension (kept under agitation) of 0.18 g. of $PdCl_2$ in about 30 cc. of methanol was introduced into the flask. After 4 hours dropping, the solition was allowed to react for further 3 hours.

The methyl moconate already partially precipitated from the solution and was separated.

Methanol was then distilled, water was added to the residue and the whole was extracted carefully with ethyl ether. The residue of the distillation of the ether extract contains prevailingly methyl maleate together with little fumarate (ratio about 12:1) and methyl muconate.

After hydrogenation of the double bonds on Pd, 2.62 g. of a mixture containing 34.4% of methyl succinate and 38.2% of methyl adipate is obtained.

EXAMPLE 2

Into a 250 cc. flask, equipped with agitator, reflux condenser, inlet and outlet gas tube, thermometer, 60 cc. of methanol, 0.25 g. of $PdCl_2$ (1.4 mM.) and 0.5 g. of thiourea were introduced. A stream of technical $C_2H_2$ and CO was passed for 10 hours, each one 3 l./h., at temperature between 15 and 20° C. The solution maintained a yellowish color and in time a white precipitate separated, which for the most part consists of methyl muconate.

By working as in the preceding example, a mixture was obtained, which contains muconate, maleate and fumarate in amount corresponding to 4.4 mols of methyl muconate, 1.8 mols of methyl maleate and 0.7 mol of methyl fumarate for each mol of used $PdCl_2$. The ratio muconate/(maleate+fumarate) was about 4:1, using a ratio $C_2H_2$:CO of 3:1.

EXAMPLE 3

Into a 250 cc. flask, equipped with mechanical agitator and reflux condenser and containing 125 mg. of thiourea dissolved in 60 cc. of distilled methanol, CO, $C_2H_2$ and air were bubbled at the following flows: 4.1 l./h., 4.8 l./h., 0.42 l./h. A very fine suspension of $PdCl_2$ in methanol was contemporaneously introduced into the flask dropwise, 86 cc. of the suspension, containing 92.6 mg. of $PdCl_2$, were introduced within 4.5 hours. The bubbling of the gases was then continued for further two hours. The temperature was maintained at about 15° C. At the end of the run, the methanol was distilled off, and the residue was extracted with ether. The ether layer was washed many times with water, dried on anhydrous $Na_2SO_4$ and the ether was distilled off.

The residue which consisted of a mixture of liquid and solid products was dissolved in acetone and subjected to gas chromatography. A weighed amount of methyl glutarate was used as a standard.

1.51 g. of esters of $C_4$ and $C_6$ acids distributed as follows:

| | G. |
|---|---|
| Methyl fumarate | 0.04 |
| Methyl maleate | 0.95 |
| Cis-cis methyl muconate | 0.10 |
| Cis-trans methyl muconate | 0.10 |
| Trans-trans methyl muconate | 0.32 | were obtained.

The catalytic activity, referred to the $PdCl_2$, which has been consumed and calculated only for the above written esters, was 19.6 mols of product per mol of $PdCl_2$.

EXAMPLE 4

Into a 250 cc. flask, equipped with mechanical agitator, reflux condenser and dropping funnel, and containing 29.7 mg. of thiourea dissolved in 50 cc. of methanol, CO, $C_2H_2$ and air were bubbled at the following rates: 4.1 l./h., 4.8 l./h., 0.22 l./h. A solution consisting of 89.3 mg. of $PdCl_2$ and 125 mg. of thiourea dissolved in 70 cc. of methanol were contemporaneously introduced dropwise into the flask, within 4 hours. The bubbling of the gases was continued for further 3.5 hours. The temperature was maintained at about 15° C. At the end of the run, the same treatment of the preceding example was carried out. 1.24 g. of esters of $C_4$ and $C_6$ acids thus distributed:

| | G. |
|---|---|
| Methyl fumarate | 0.09 |
| Methyl maleate | 0.55 |
| Cis-cis methyl muconate | 0.13 |
| Cis-trans methyl muconate | 0.06 |
| Trans-transmethyl muconate | 0.41 | were obtained.

The catalytic activity, referred to $PdCl_2$ which has been consumed and calculated only for the above written esters, corresponds to 15.9 mols of product per mol of $PdCl_2$.

EXAMPLE 5

Into a 250 cc. flask, equipped with mechanical agitator, cooler and dropping funnel, and containing 29.6 mg. of thiourea dissolved in 50 cc. of methanol, CO, $C_2H_2$ and air were bubbled at the following flows: 4.1 l./h., 4.8 l./h., 0.22 l./h. A solution consisting of 90.8 mg. of 87% $PdI_2$ and 62.7 mg. of thiourea dissolved in 70 cc. of methanol were contemporaneously introduced dropwise. The dropwise introduction lasted 4 hours. The bubbling of the gases was continued for further 3 hours. The temperature was maintained at about 15° C.

After the previously mentioned treatments of the solution, 0.82 g. of esters of $C_4$ and $C_6$ acids distributed as follows:

| | G. |
|---|---|
| Methyl fumarate | 0.04 |
| Methyl maleate | 0.50 |
| Cis-cis methyl muconate | 0.02 |
| Methyl dihydromuconate | 0.03 |
| Trans-trans methyl muconate | 0.23 | were obtained.

The catalytic activity, referred to the $PdI_2$, which has been introduced and calculated for the above written esters, corresponded to 24.3 mols per mol of $PdI_2$.

EXAMPLE 6

Into a 250 cc. flask, equipped with mechanical agitator, cooler and dropping funnel, and containing 30 mg. of thiourea dissolved in 50 cc. of absolute ethyl alcohol, CO, $C_2H_2$ and air at the following flow rate: 4.1 l./h., 4.8 l./h., 0.22 l./h., were bubbled. Contemporaneously a mixture consisting of 90 mg. of $PdCl_2$ and 125 mg. of thiourea in 80 cc. of absolute ethyl alcohol were introduced dropwise into the flask. The introduction of the mixture lasted 4 hours. The bubbling of the gases was continued for an additional 3 hours. The temperature was maintained at about 15° C. After the previously mentioned treatments of the solution, 0.65 g. of esters of $C_4$ and $C_6$ acids (prevailingly ethyl muconate and ethyl maleate) were obtained.

EXAMPLE 7

Into a 100 cc. flask, equipped with mechanical agitator, reflux cooler and containing 125 mg. of thiourea dissolved in 100 cc. of methanol, CO, $C_2H_2$ and air were bubbled at the following flow rates: 4.1 l./h., 4.8 l./h., 0.22 l./h. Contemporaneously, a very fine suspension of $PdCl_2$ in methanol was introduced dropwise into the flask. 22 cc. of the suspension containing 87 mg. of $PdCl_2$ were introduced within 3 hours and half. The bubbling of the gases was then continued for further 3 hours and half. The temperature was maintained at about 15° C.

1.06 g. of esters of $C_4$ and $C_6$ acids distributed as follows:

| | G. |
|---|---|
| Methyl fumarate | 0.01 |
| Methyl maleate | 0.35 |
| Cis-cis methyl muconate | 0.04 |
| Trans-trans methyl muconate | 0.66 | were obtained.

The catalytic activity, referred to $PdCl_2$ which has been consumed and calculated only for the above written esters, is 13.8 mols of product per mol of $PdCl_2$.

We claim:

1. A process for preparing alkyl muconates and maleates from acetylene, carbon monoxide and an alcohol selected from methanol and ethanol, which comprises carrying out the reaction in an alcoholic solution of thiourea containing a palladium halide catalyst, selected from $PdCl_2$, $PdBr_2$, $PdI_2$, at temperatures from 0° to 30° C. and under atmospheric pressure.

2. The process of claim 1, wherein oxygen is added to the reaction mixture in amount lower than 1% by volume on the gases and higher than 0.5 M for 1 M of palladium halide.

3. The process of claim 2, wherein the molar ratios used are from 3 to 0.3 for $C_2H_2/CO$ and from 2 to 10 for thiourea/palladium halide.

4. The process of claim 1, wherein palladium halide is added gradually to the reaction mixture in form of suspension in alcohol.

5. The process of claim 4, wherein thiourea is present in the palladium halide alcoholic suspension.

References Cited

UNITED STATES PATENTS 3,032,583  5/1962  Chiusoli et al. _____ 260—486

OTHER REFERENCES

Tsuji et al.: J.A.C.S., 86, p. 2095 (1964).

JAMES A. PATTEN, Primary Examiner

E. J. SKELLY, Assistant Examiner